United States Patent
Robert et al.

(10) Patent No.: US 10,141,550 B2
(45) Date of Patent: Nov. 27, 2018

(54) POUCH BATTERY CELL ASSEMBLY FOR TRACTION BATTERY

(71) Applicant: Ford Global Technologies, LLC, Dearborn, MI (US)

(72) Inventors: Brian Joseph Robert, St. Clair Shores, MI (US); Andrew Robert Drews, Ann Arbor, MI (US); Mohan Karulkar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 15/298,517

(22) Filed: Oct. 20, 2016

(65) Prior Publication Data

US 2018/0114955 A1    Apr. 26, 2018

(51) Int. Cl.
| | |
|---|---|
| *H01M 2/12* | (2006.01) |
| *H01M 2/06* | (2006.01) |
| *H01M 2/30* | (2006.01) |
| *H01M 2/10* | (2006.01) |
| *B60K 1/04* | (2006.01) |
| *B60K 6/52* | (2007.10) |
| *B60K 6/42* | (2007.10) |

(52) U.S. Cl.
CPC .............. *H01M 2/06* (2013.01); *B60K 1/04* (2013.01); *B60K 6/52* (2013.01); *H01M 2/1072* (2013.01); *H01M 2/1223* (2013.01); *H01M 2/305* (2013.01); *B60K 6/42* (2013.01); *B60K 2001/0416* (2013.01); *B60Y 2200/92* (2013.01); *B60Y 2400/112* (2013.01); *H01M 2220/20* (2013.01); *Y10S 903/907* (2013.01)

(58) Field of Classification Search
None
See application file for complete search history.

(56) References Cited

U.S. PATENT DOCUMENTS

| | | | |
|---|---|---|---|
| 7,763,379 B2 | 7/2010 | Moon et al. | |
| 8,313,857 B2 | 11/2012 | Kim | |
| 9,184,421 B2 | 11/2015 | Park et al. | |
| 9,231,240 B2 | 1/2016 | Song et al. | |
| 2011/0300414 A1 | 12/2011 | Baek | |
| 2013/0034763 A1 | 2/2013 | Byun | |
| 2013/0330606 A1 | 12/2013 | Kwon et al. | |
| 2014/0199581 A1* | 7/2014 | Ryu ................ | H01M 10/0413 429/161 |
| 2015/0072185 A1* | 3/2015 | Cho ....................... | H01M 2/30 429/56 |

\* cited by examiner

*Primary Examiner* — Yoshitoshi Takeuchi
(74) *Attorney, Agent, or Firm* — James Dottavio; Brooks Kushman, P.C.

(57) ABSTRACT

A pouch battery cell assembly for a traction battery includes a housing, a first intermediate terminal member, and a first terminal tab. The housing defines a cavity. The first intermediate terminal member is disposed at least partially within the housing and defines an access port open to an exterior of the housing and the cavity which may be sized for electrolyte injection. The first terminal tab is embedded within the first intermediate terminal member. A pressure sensitive release mechanism may be disposed within the access port to selectively vent gases from the cavity. A second intermediate terminal member may be at least partially disposed within the housing and a second terminal tab may be embedded within the second intermediate terminal member.

11 Claims, 5 Drawing Sheets

POUCH BATTERY CELL ASSEMBLY FOR TRACTION BATTERY

TECHNICAL FIELD

This disclosure relates to battery cell assemblies for traction batteries utilized in vehicles.

BACKGROUND

Pouch battery cells are used to power components of electrified vehicles. The pouch battery cells may be electrically connected to one another in an array. Sealing robustness at electrode tabs, venting control, and electrolyte filling are three areas that present challenges in a utilization and manufacturing of pouch battery cells.

SUMMARY

A pouch battery cell assembly for a traction battery includes a housing, a first intermediate terminal member, and a first terminal tab. The housing defines a cavity. The first intermediate terminal member is disposed at least partially within the housing and defines an access port open to an exterior of the housing and the cavity. The first terminal tab is embedded within the first intermediate terminal member. A pressure sensitive release mechanism may be disposed within the access port to selectively vent gases from the cavity. A second intermediate terminal member may be at least partially disposed within the housing and a second terminal tab may be embedded within the second intermediate terminal member. The first intermediate terminal member and the second intermediate terminal member may be a single component. The access port may be sized for venting gases from the cavity. The access port may be sized to receive electrolyte injection to deliver electrolyte within the cavity. A seal may be disposed between the first intermediate terminal member and the housing.

A pouch battery cell assembly includes a housing, an intermediate structure, and a pair of terminal tabs. The housing defines a cavity. The intermediate terminal structure is at least partially disposed within the housing and includes first and second members, a central portion connecting the members, and defines an access port open to an exterior of the housing and the cavity. One of each of the terminal tabs is embedded within one of the members and extends from the cavity to a location external to the housing. The terminal tabs and the intermediate terminal structure may be arranged with one another such that each of the terminal tabs is spaced equidistant from the access port. The intermediate terminal structure may be injection molded. A vent mechanism may be disposed within the access port to selectively vent gases from the cavity. The access port may be sized to receive electrolyte injection to deliver electrolyte within the cavity. Each of the first and second members may be almond shaped, tear-drop shaped, or an elongated diamond shaped. The housing may be made of a conformal polymer/aluminum laminate vacuum sealed.

A vehicle includes a traction battery to selectively power components of the vehicle. The traction battery includes an array of pouch battery cell assemblies. Each of the pouch battery cell assemblies includes a housing, an intermediate terminal structure, and a pair of terminal tabs. The housing defines a cavity. The intermediate terminal structure is at least partially disposed within the housing and defines an access port. Each of the pair of terminal tabs is embedded within the intermediate terminal structure. The intermediate terminal structure and the housing are arranged with one another such that the access port is open to the cavity and a location outside the housing. The intermediate terminal structure may include a first member injection molded to receive one of the pair of terminal tabs and a second member injection molded to receive another of the pair of terminal tabs. A seal may be disposed between the intermediate terminal structure and the housing. The intermediate terminal structure and the housing may be further arranged with one another such that each of the pair of terminal tabs extends from the cavity to a location outside of the housing. A vent mechanism may be disposed within the access port to selectively release gases from the cavity. The housing may be made of a conformal polymer/aluminum laminate vacuum sealed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
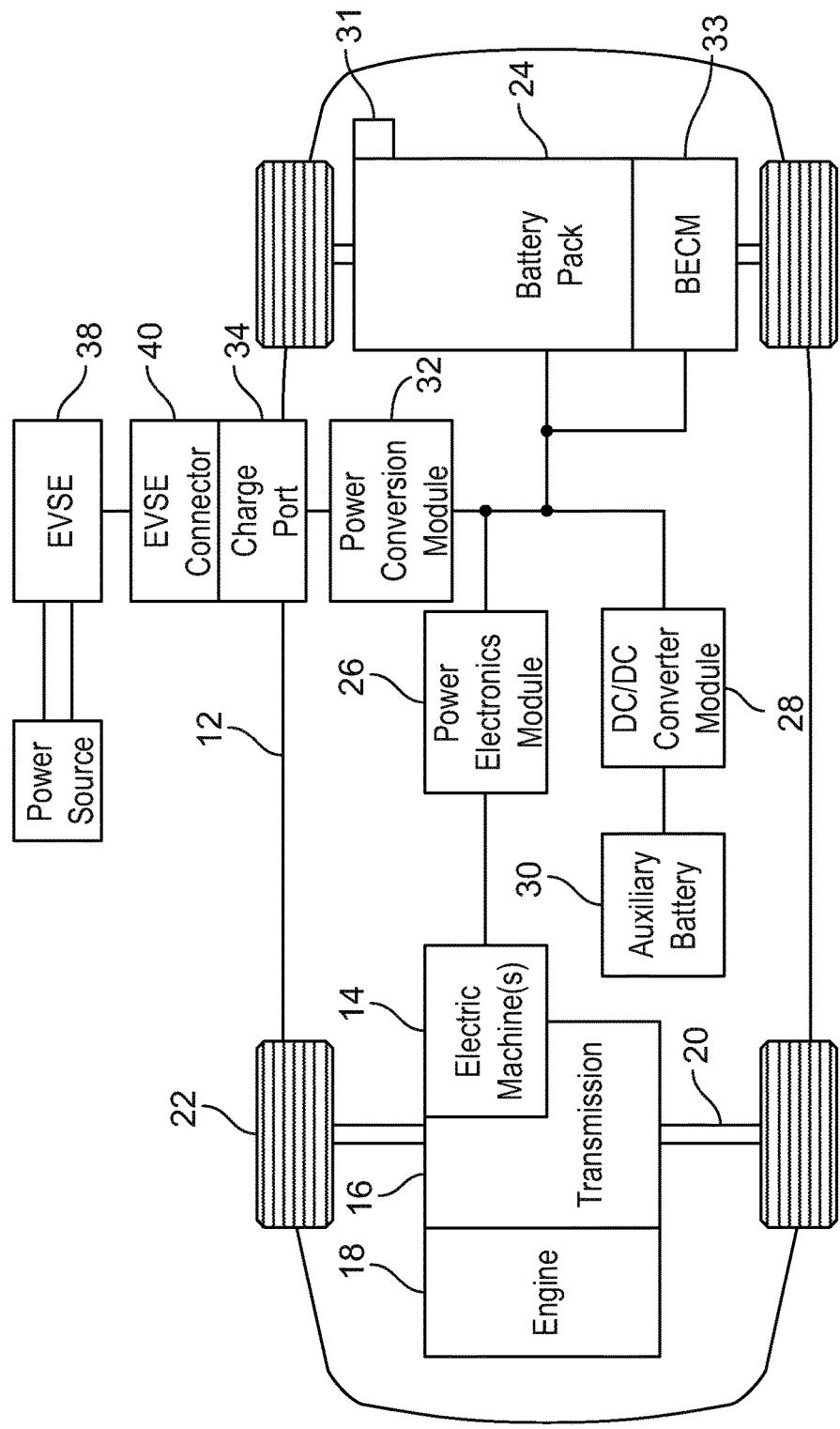
FIG. 1A is a schematic diagram depicting an example of an electric vehicle.

FIG. 1A depicts a schematic diagram of an example of an electrified vehicle, referred to generally as a vehicle 12 herein. The vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. Examples of the battery cells include pouch battery cells and prismatic battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems and components. An example of a system includes a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a plug-in electric vehicle ("PHEV"), a mild hybrid electric vehicle ("MHEV"), or a battery electric vehicle ("BEV") in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells may include electrochemical cells that convert stored chemical energy to electrical energy. Each of the battery cells may include a housing, a positive electrode (cathode) and a negative electrode (anode). An electrolyte may allow ions to move between the anode and cathode during discharge, and then return during recharge. Terminals may allow current to flow out of the cell for use by the vehicle 12. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

Figure 1B:
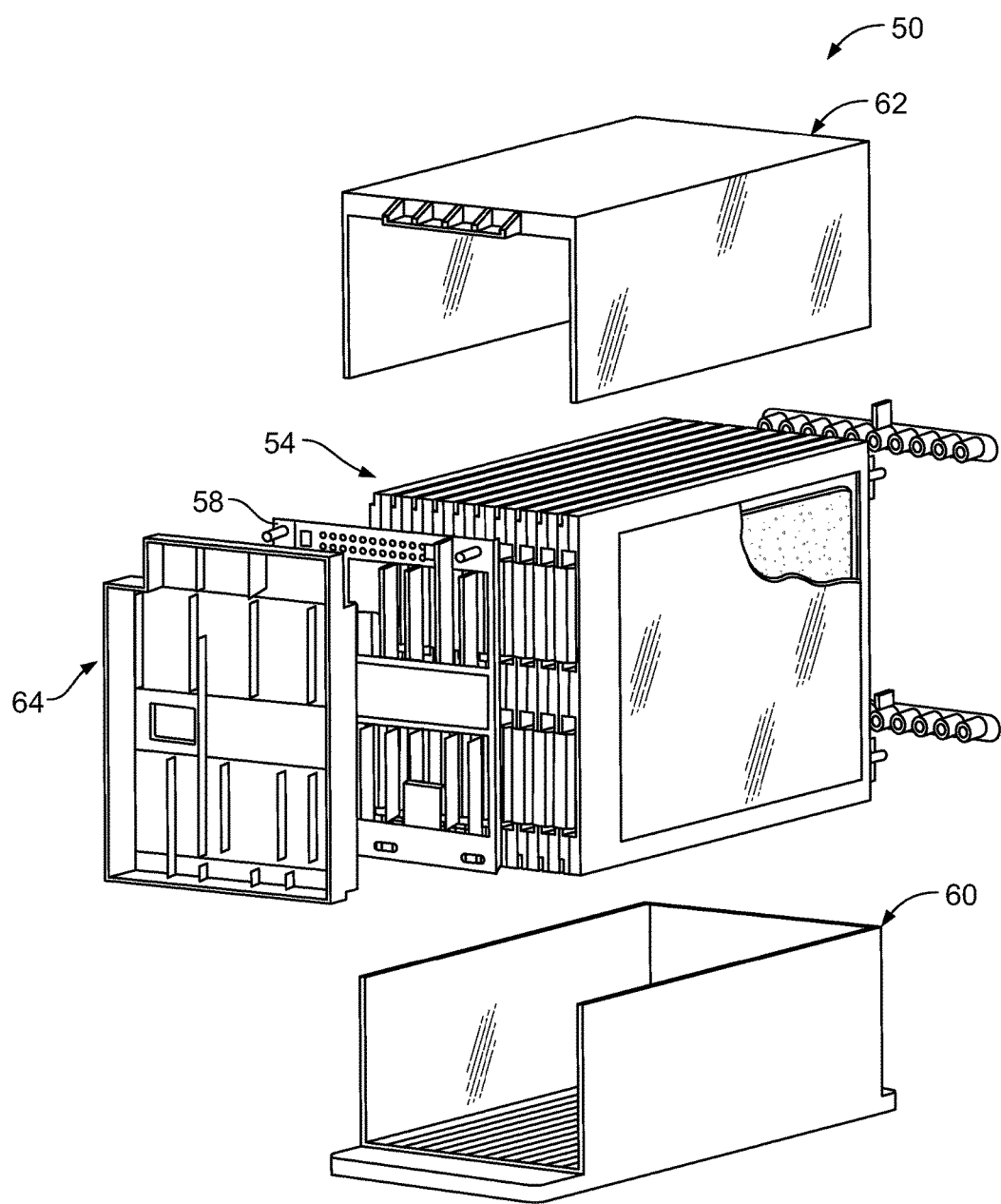
FIG. 1B is a perspective view of an example of a portion of a traction battery assembly shown partially exploded and including pouch battery cells.

FIG. 1B shows an example of a portion of a traction battery assembly including pouch battery cells referred to generally as a traction battery assembly 50 herein. The traction battery assembly 50 includes a battery cell array 54 having a plurality of pouch battery cells. Each of the pouch battery cells may include a retainer that surrounds the minor sides of the cell and assists in securing the pouch battery cell within the battery cell array 54. A control board 58 may be disposed on one side of the battery cell array 54. For example, the control board 58 may be disposed on a terminal side of the battery cell array 54. The control board 58 may include slots for receiving the terminals of each of the pouch battery cells. The terminals are electrically connected with a high-voltage bussing of the control board 58 via weld, braising, or other means. The control board 58 is electrically connected with one or more of the vehicle controllers. The traction battery assembly 50 also includes a housing that surrounds the internal components of the traction battery assembly 50. The housing may include a bottom portion 60, a top portion 62, and a front cover 64.

Figure 1D:
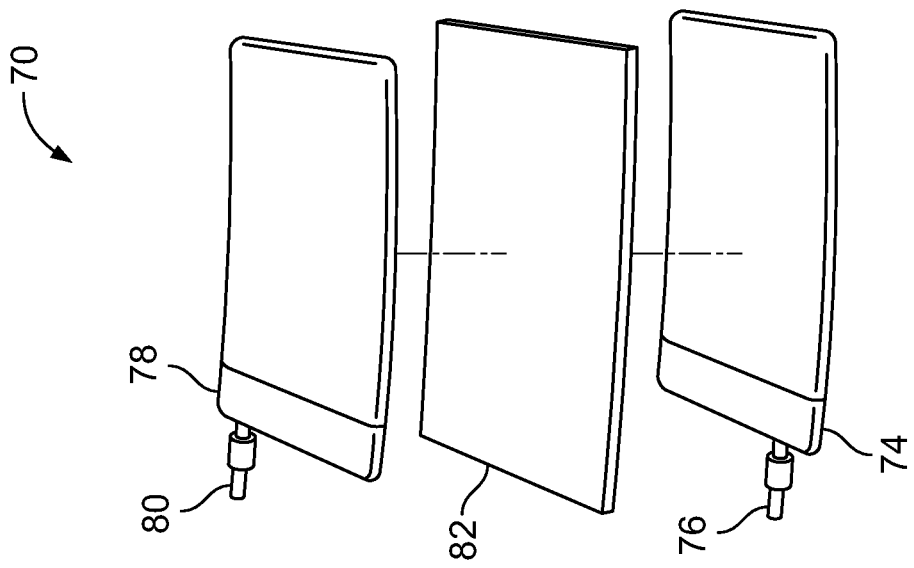
FIG. 1D is a perspective view of the example of the pouch battery cell of FIG. 1C shown exploded.
Figure 1C:
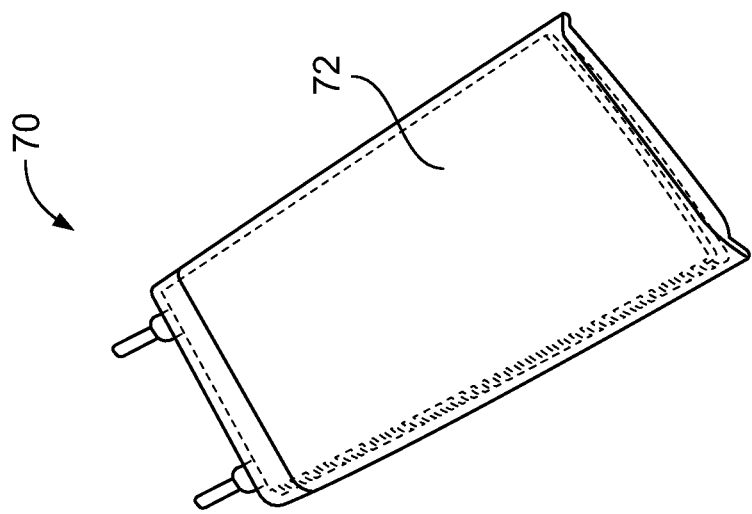
FIG. 1C is a perspective view of an example of a pouch battery cell of the traction battery assembly of FIG. 1B.

FIGS. 1C and 1D show an example of a pouch battery cell, referred to as a pouch battery cell 70 herein. The pouch battery cell 70 may have a laminated architecture in a pouch 72. The pouch battery cell 70 includes a cathode structure 74 with a battery tab or terminal tab 76, an anode structure 78 with a battery tab or terminal tab 80, and separators 82 disposed between the cathode structure 74 and the anode structure 78. After the laminated layers are assembled together and inserted into the pouch 72, the pouch 72 is filled with electrolyte and subsequently sealed in such as a way that the terminal tab 76 and the terminal tab 80 extend outside of the pouch 72. The pouch battery cell 70 may be a lithium-ion battery with an electrolyte. The cathode structure 74 may incorporate an Al or Ni foil current collector and the anode structure 78 may incorporate a copper or nickel foil current collector.

Figure 2:
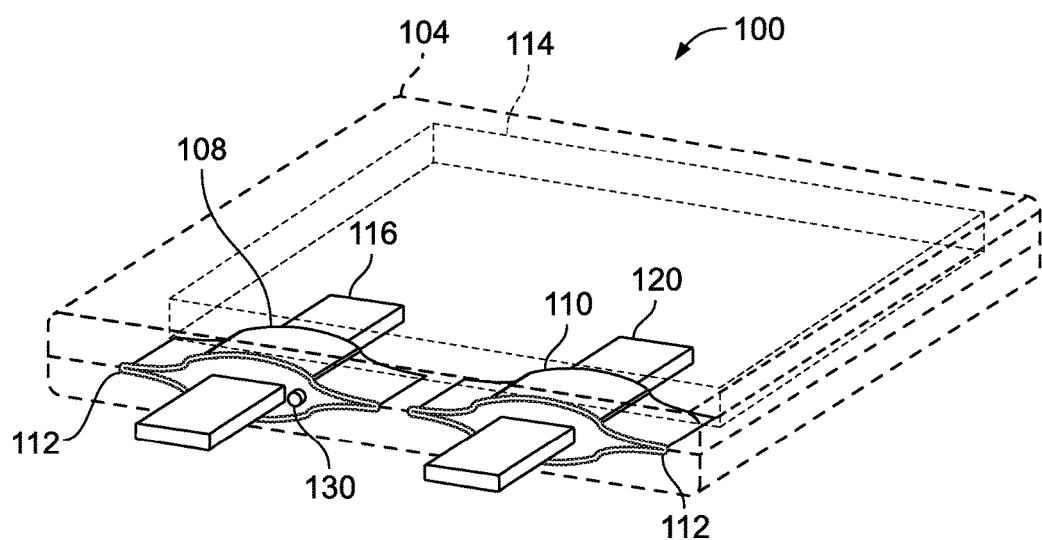
FIG. 2 is a perspective view of an example of a pouch battery cell shown with examples of two terminal assemblies.
Figure 3:
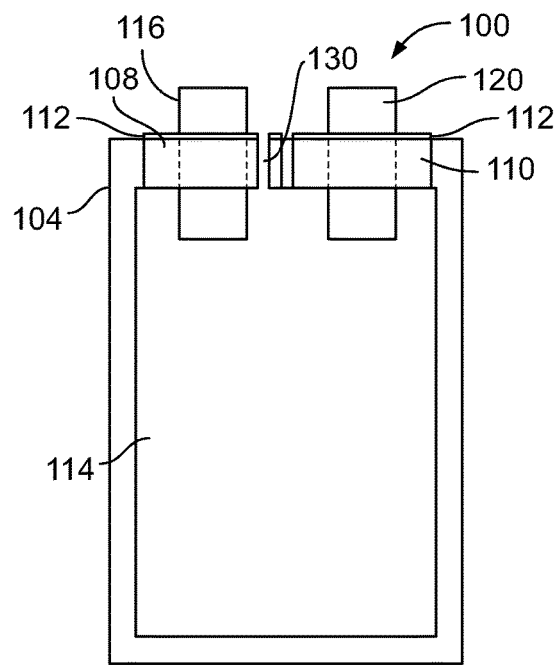
FIG. 3 is a front view, in cross-section, of the pouch battery cell of FIG. 2.

FIGS. 2 and 3 show an example of a battery cell assembly for a traction battery, referred to generally as a battery cell assembly 100 herein. The battery cell assembly 100 may be structured as a pouch battery cell assembly or a prismatic battery cell assembly. More than one battery cell assembly 100 may be aligned in an array with busbars interconnecting the battery cell assemblies 100 in parallel or series to provide power for vehicle components. For example, a plurality of battery cell assemblies 100 may be in electrical communication with one another within a traction battery, such as the traction battery 24 described above.

The battery cell assembly 100 may include a housing 104, a first intermediate terminal member 108, and a second intermediate terminal member 110. The first intermediate terminal member 108 and the second intermediate terminal member 110 may be almond shaped with two wings extending from opposing ends. Alternatively, the intermediate terminal members may define other shapes such as a teardrop, an elongated diamond, or other suitable shaped that include soft transition contours. A seal 112 may be located between the housing 104 and the first intermediate terminal member 108, and between the housing 104 and the second intermediate terminal member 110. Additionally, an upper portion of the housing 104 and a lower portion of the housing 104 may be sealed to one another. The housing 104 may define a cavity 114 sized to retain battery cell active materials such as an anode, a cathode, a separator, and electrolyte. The housing 104 for pouch battery cells may be made of a conformal polymer/aluminum laminate vacuum sealed about the battery cell active materials. For example, two separate stacked laminate pieces may be sealed on all four edges or one single laminate piece folded in half may be sealed along either three or all four edges. This construction provides a conformal shape in which the submitted terminal housing enables a more intimate interface and higher quality seal compared to that of traditionally sealing process around terminals directly.

A first terminal tab 116 may be embedded within the first intermediate terminal member 108 and a second terminal tab 120 may be embedded within the second intermediate terminal member 110. Each of the terminal tabs may be embedded with the respective intermediate terminal member via, for example, injection molding, 3D printing, or casting. The seal 112 between the respective intermediate terminal member and the housing 104 may alleviate difficulties associated with sealing the respective terminal tabs to the housing 104 due to materials involved therewith. As such, an upper surface of the respective intermediate terminal member may be flush with an upper surface of the housing 104 or may be offset from the upper surface of the housing 104.

One of the intermediate terminal members may define an access port open to the cavity 114. For example, access port 130 may be defined by the first intermediate terminal member 108. Alternatively, it is contemplated that the second intermediate terminal member 110 may define an access port open to the cavity 114.

Figure 4:
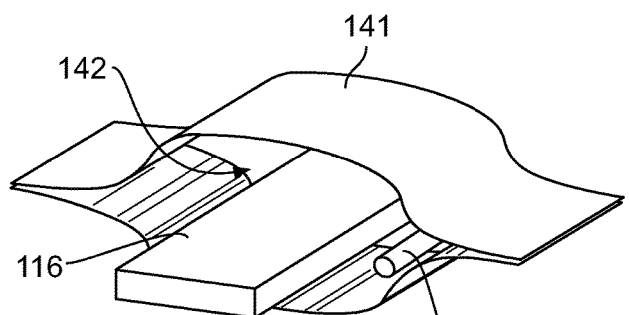
FIG. 4 is an exploded view of a portion of one of the two terminal assemblies of FIG. 2.

FIG. 4 shows an exploded view of a portion of the battery cell assembly 100. A cylindrical spacer 140, an intermediate member spacer 141, and the first terminal tab 116 may be arranged with one another to facilitate injection molding of one of the intermediate terminal structures, such as the first intermediate terminal member 108. For example, the cylindrical spacer and the first terminal tab 116 may be positioned within a cavity 142 defined by the intermediate member spacer 141. Examples of material which may be injection molded for the first intermediate terminal member 108 include various plastics and fibers which are chemically resistant to electrolyte and electrically isolative. The material may be fed into a heated barrel and then injected into the cavity 142. Once the material has hardened, the first terminal tab 116 is embedded within the material and the cylindrical spacer 140 may be removed to provide an access port, such as the access port 130.

Figure 5:
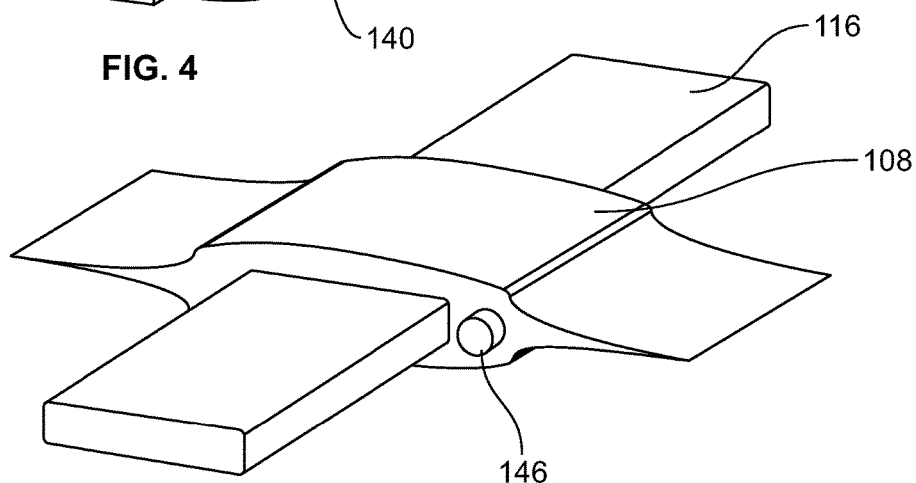
FIG. 5 is a perspective view of a portion of one of the terminal assemblies of FIG. 2.

The access port 130 may provide a conduit to inject electrolyte within the cavity 114. For example, electrolyte may be injected into the cavity 114 during cell fabrication or cell formation. The access port 130 may also provide a location to receive a vent mechanism 146 as shown in FIG. 5. The vent mechanism 146 may be mounted within the access port 130 during a final sealing operation. In one example, the vent mechanism 146 is a pressure sensitive release mechanism. The vent mechanism 146 may assist in controlling a release of gases from within the cavity 114. For example, under certain failure conditions such as overcharge and short-circuit, the vent mechanism 146 may selectively release excess gases to mitigate swelling and to prevent failure modes of the battery cell assembly 100.

Figure 6:
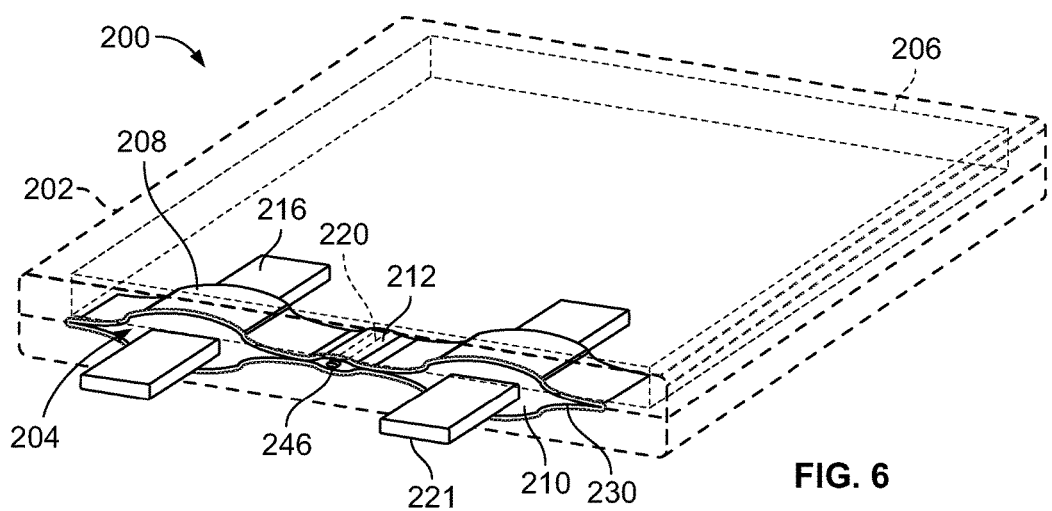
FIG. 6 is a perspective view of another example of a terminal assembly for the pouch battery cell of FIG. 2.

FIG. 6 shows another example of a battery cell assembly, referred to generally as a battery cell assembly 200 herein. The battery cell assembly 200 may be structured as a pouch battery cell assembly or a prismatic battery cell assembly. More than one battery cell assembly 200 may be aligned in an array with busbars interconnecting the battery cell assemblies 200 in parallel or series to provide power for vehicle components. For example, a plurality of battery cell assemblies 200 may be in electrical communication with one another within a traction battery, such as the traction battery 24 described above.

The battery cell assembly 200 includes a housing 202 and an intermediate terminal structure 204. The housing 202 may define a cavity 206 sized to retain electrolyte. The intermediate terminal structure 204 includes a first member 208, a second member 210, and a central portion 212. The central portion 212 connects the first member 208 and the second member 210. The central portion 212 may define an access port 220 open to the cavity 206. Though in this example the central portion 212 defines the access port 220, it is contemplated that either of the members may define an access port open to the cavity 206.

The first member 208 and the second member 210 may be almond shaped with two wings extending from opposing ends. Alternatively, the members may define other shapes such as a tear-drop, an elongated diamond, or other suitable shaped that include soft transition contours. A seal 230 may be located between the housing 202 and the intermediate terminal structure 204.

A first terminal tab 216 may be embedded within the first member 208 and a second terminal tab 221 may be embedded within the second member 210. Each of the terminal tabs may be embedded with the respective member via, for example, injection molding. The seal 230 between the respective members and the housing 202 may alleviate difficulties associated with sealing the respective terminal tabs to the housing 202 due to materials involved therewith. As such, an upper surface of the respective member may be flush with an upper surface of the housing 202 or may be offset from the upper surface of the housing 202. The first terminal tab 216 and the second terminal tab 221 may be arranged with the intermediate terminal structure 204 such that each of the terminal tabs is spaced equidistant from the access port 220.

The access port 220 may provide a conduit to inject electrolyte within the cavity 206. For example, electrolyte may be injected into the cavity 206 during cell fabrication or cell formation. The access port 220 may also provide a location to receive a vent mechanism 246. The vent mechanism 246 may be mounted within the access port 220 during a final sealing operation. In one example, the vent mechanism 246 is a pressure sensitive release mechanism. The vent mechanism 246 may assist in controlling a release of gases from within the cavity 206. For example, under certain failure conditions such as overcharge and short-circuit, the vent mechanism 246 may selectively release excess gases to mitigate swelling and to prevent failure modes of the battery cell assembly 200.

As described above, embedding a terminal tab within an intermediate structure may assist in improving contact between the intermediate structure and a housing of a pouch battery cell in comparison to previous designs. An addition of an access port to a cavity defined by the housing provides a conduit for electrolyte injection during cell formation and also provides a location for a vent mechanism to assist in releasing gases during use of the pouch battery cell.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A pouch battery cell assembly comprising:
   a housing defining a cavity;
   an intermediate structure partially disposed and sealed within the housing, the intermediate structure including almond-shaped first and second members and a central portion connecting the members and defining an access port open to a housing exterior and the cavity; and
   each of a terminal tab pair embedded within a different one of the members and extending from the cavity to the housing exterior.

2. The assembly of claim 1, wherein the terminal tabs and the intermediate structure are arranged with one another such that each of the terminal tabs is spaced equidistant from the access port.

3. The assembly of claim 1, wherein the intermediate structure is injection molded.

4. The assembly of claim 1 further comprising a vent mechanism disposed within the access port to selectively vent gases from the cavity.

5. The assembly of claim 1, wherein the access port is sized to receive electrolyte injection to deliver electrolyte within the cavity.

6. The assembly of claim 1, wherein each of the first and second members is tear-drop shaped or elongated diamond-shaped.

7. The assembly of claim 1, wherein the housing is vacuum sealed and made of a conformal polymer/aluminum laminate.

8. A pouch battery cell assembly for a traction battery comprising:
   a housing defining a cavity;
   an almond-shaped first intermediate terminal member disposed at least partially within the housing and defining an access port open to an exterior of the housing and the cavity;
   a first terminal tab embedded within the first intermediate terminal member;
   an almond-shaped second intermediate terminal member disposed at least partially within the housing and spaced from the first intermediate terminal member;
   a second terminal tab embedded within the second intermediate terminal member;
   a central member extending between the first and second intermediate terminal members; and
   a seal extending about an upper portion of each of the first and second intermediate terminal members and the central member.

9. The assembly of claim 8 further comprising a pressure sensitive release mechanism disposed within the access port to selectively vent gases from the cavity.

10. The assembly of claim 8, wherein the access port is sized for venting gases from the cavity.

11. The assembly of claim 8, wherein the access port is sized to receive electrolyte injection to deliver electrolyte within the cavity.

\* \* \* \* \*